United States Patent
Voellm

(10) Patent No.: US 7,962,922 B2
(45) Date of Patent: Jun. 14, 2011

(54) DELIVERING CALLBACKS INTO SECURE APPLICATION AREAS

(75) Inventor: Anthony F. Voellm, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1320 days.

(21) Appl. No.: 11/467,867

(22) Filed: Aug. 28, 2006

(65) Prior Publication Data
US 2008/0127301 A1 May 29, 2008

(51) Int. Cl.
G06F 3/00 (2006.01)
G06F 9/44 (2006.01)
G06F 9/46 (2006.01)
G06F 13/00 (2006.01)

(52) U.S. Cl. .................... 719/319; 719/318

(58) Field of Classification Search ........... 719/313–320
See application file for complete search history.

(56) References Cited

U.S. PATENT DOCUMENTS

| | | | |
|---|---|---|---|
| 5,825,882 A * | 10/1998 | Kowalski et al. | 713/172 |
| 6,226,693 B1 * | 5/2001 | Chow et al. | 719/318 |
| 6,446,136 B1 * | 9/2002 | Pohlmann et al. | 719/318 |
| 7,000,237 B1 * | 2/2006 | Sinha | 719/318 |
| 7,565,279 B2 * | 7/2009 | Bordes | 703/17 |
| 2003/0018827 A1 * | 1/2003 | Guthrie et al. | 709/318 |
| 2003/0101291 A1 * | 5/2003 | Mussack et al. | 709/328 |
| 2005/0125808 A1 * | 6/2005 | Izurieta | 719/318 |
| 2005/0273797 A1 * | 12/2005 | Shih | 720/654 |
| 2006/0230128 A1 * | 10/2006 | Chung et al. | 709/223 |
| 2007/0089116 A1 * | 4/2007 | Chao | 719/318 |

* cited by examiner

*Primary Examiner* — Diem K Cao
(74) *Attorney, Agent, or Firm* — Shook, Hardy & Bacon LLP

(57) ABSTRACT

A native callback function is registered with a calling component in a native code environment, wherein registering the native callback function is initiated from a secure application area in a managed code environment. A callback is delivered from the native callback function into the secure application area.

14 Claims, 4 Drawing Sheets

DELIVERING CALLBACKS INTO SECURE APPLICATION AREAS

BACKGROUND

Secure application areas are used to isolate applications running in a managed code environment. In some systems today, in order to maintain the security of a secure application area, the ability to directly call into the secure application area from anonymous threads in native code is prohibited. This security feature often conflicts with the callback model of native code to notify an application in a secure application area that a registered event has occurred.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Embodiments of the invention provide for delivering callbacks into a managed code environment without directly calling into a secure application area. In one embodiment, an operating system (OS) event object is shared between a managed code environment and a native code environment. When an event registered by managed code occurs, the native callback function places callback data in a data region and sets the OS event object. The OS event object signals the managed code environment that the registered event has occurred. The managed code environment may then retrieve the callback data from the data region.

Many of the attendant features will be more readily appreciated as the same becomes better understood by reference to the following detailed description considered in connection with the accompanying drawings.

BRIEF DESCRIPTION OF THE DRAWINGS

Like reference numerals are used to designate like parts in the accompanying drawings.

DETAILED DESCRIPTION

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

Figure 1:
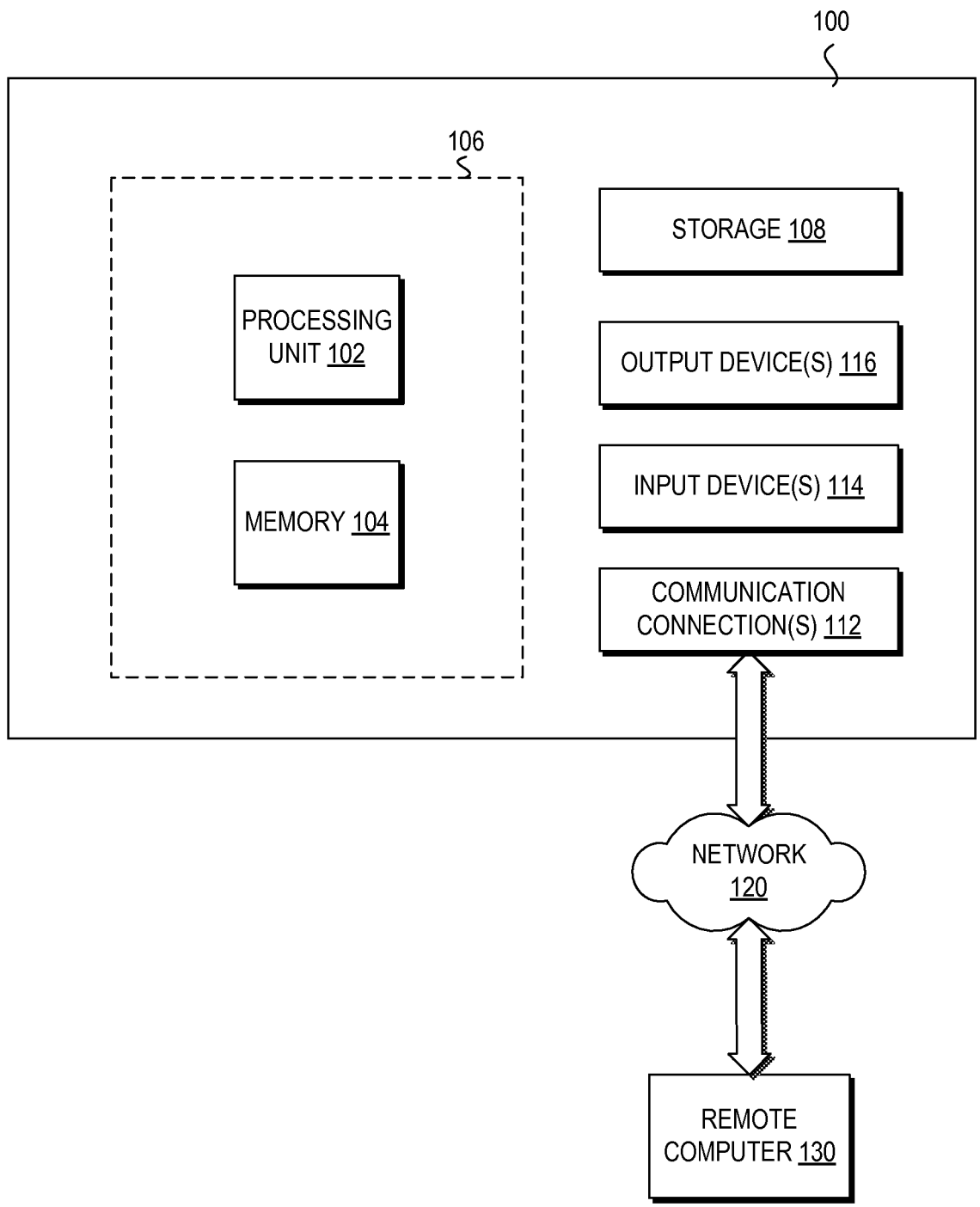
FIG. 1 is a block diagram of an example operating environment to implement embodiments of the invention.

FIG. 1 and the following discussion are intended to provide a brief, general description of a suitable computing environment to implement embodiments of the invention. The operating environment of FIG. 1 is only one example of a suitable operating environment and is not intended to suggest any limitation as to the scope of use or functionality of the operating environment. Other well known computing systems, environments, and/or configurations that may be suitable for use with embodiments described herein including, but not limited to, personal computers, server computers, hand-held or laptop devices, multiprocessor systems, micro-processor based systems, programmable consumer electronics, network personal computers, mini computers, mainframe computers, distributed computing environments that include any of the above systems or devices, and the like.

Although not required, embodiments of the invention will be described in the general context of "computer readable instructions" being executed by one or more computers or other computing devices. Computer readable instructions may be distributed via computer readable media (discussed below). Computer readable instructions may be implemented as program modules, such as functions, objects, application programming interfaces (APIs), data structures, and the like, that perform particular tasks or implement particular abstract data types. Typically, the functionality of the computer readable instructions may be combined or distributed as desired in various environments.

FIG. 1 shows an exemplary system for implementing one or more embodiments of the invention in a computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features and/or functionality. For example, device 100 may also include additional storage (e.g., removable and/or non-removable) including, but not limited to, magnetic or optical disks or tape. Such additional storage is illustrated in FIG. 1 by storage 108. In one embodiment, computer readable instructions to implement embodiments of the invention may be stored in storage 108. Storage 108 may also store other computer readable instructions to implement an operating system, an application program, and the like.

The term "computer readable media" as used herein includes computer storage media. Computer storage media includes volatile and nonvolatile, removable and non-removable media implemented in any method or technology for storage of information such as computer readable instructions, data structures, program modules, or other data. Memory 104 and storage 108 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by device 100. Any such computer storage media may be part of device 100.

The term "computer readable media" may include communication media. Device 100 may also include communication connection(s) 112 that allow the device 100 to communicate with other devices, such as with other computing devices through network 120. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

Device 100 may also have input device(s) 114 such as keyboard, mouse, pen, voice input device, touch input device, laser range finder, infra-red cameras, video input devices, and/or any other input device. Output device(s) 116 such as one or more displays, speakers, printers, and/or any other output device may also be included.

Those skilled in the art will realize that storage devices utilized to store computer readable instructions may be distributed across a network. For example, a remote computer 130 accessible via network 120 may store computer readable instructions to implement one or more embodiments of the invention. Computing device 100 may access remote computer 130 and download a part or all of the computer readable instructions for execution. Alternatively, computing device 100 may download pieces of the computer readable instructions, as needed, or some instructions may be executed at computing device 100 and some at remote computer 130. Those skilled in the art will also realize that all or a portion of the computer readable instructions may be carried out by a dedicated circuit, such as a Digital Signal Processor (DSP), programmable logic array, and the like.

Figure 2:
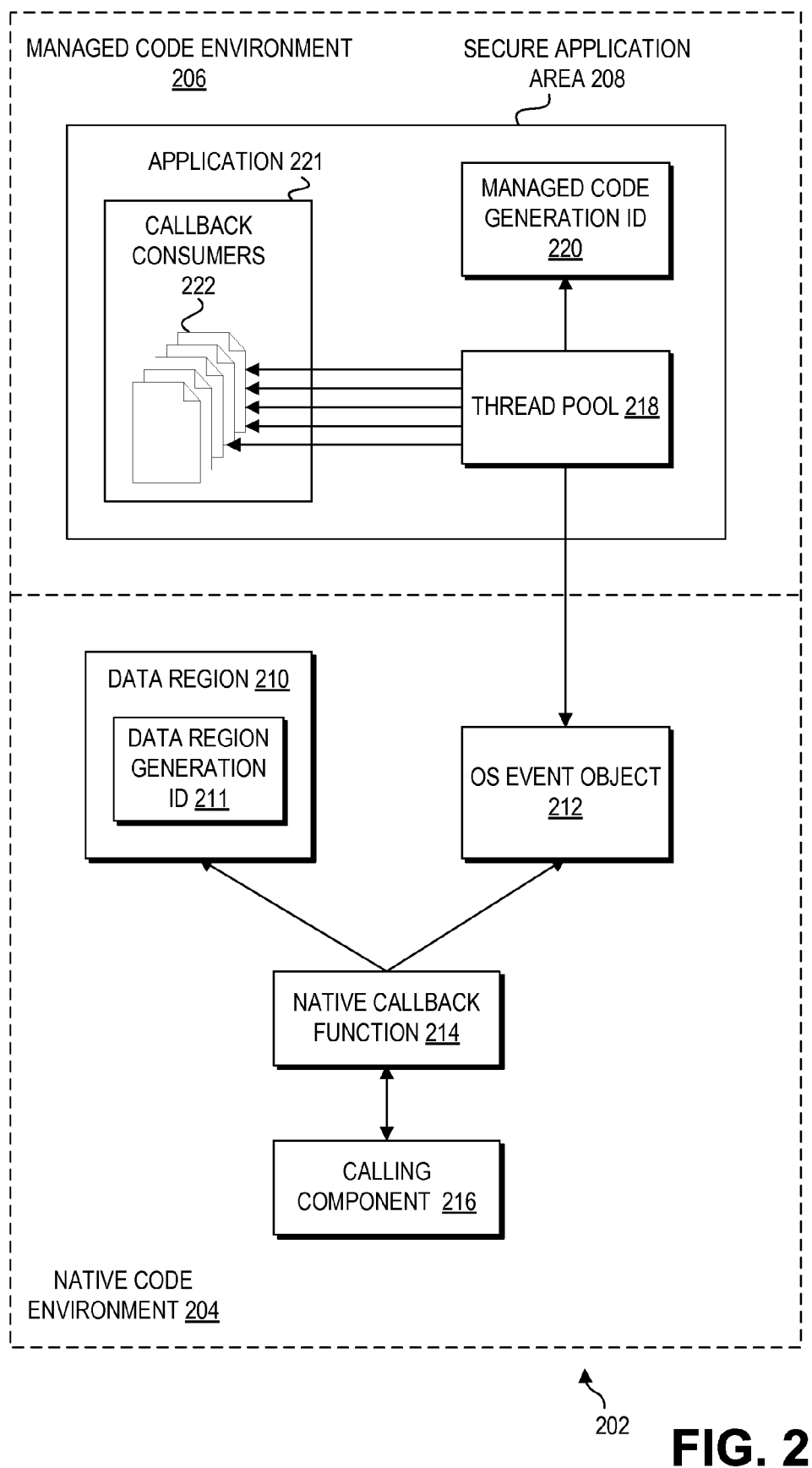
FIG. 2 is a block diagram of a system to deliver callbacks into a secure application area in accordance with an embodiment of the invention.

Turning to FIG. 2, an embodiment of an environment for delivering callbacks into a secure application area 208 from a native code environment 204 is shown. Operating system (OS) 202 includes native code environment 204 and managed code environment 206. OS 202 also includes services that may be accessed by managed code environment and/or native code environment.

As used herein a callback includes a notification that an event registered for monitoring has occurred. The callback may or may not include associated callback data. In embodiments herein, a callback is a communication from native code environment 204 to managed code environment 206 due to a previous event notification request from managed code environment 206.

While embodiments of the invention are described in connection with the Microsoft .NET Framework, one skilled in the art will appreciate that embodiments herein may be implemented in other environments, such as Java® and the Java Virtual Machine (JVM®) by Sun Microsystems, Inc. As used herein, the term "managed code" refers to any interpreted code for use in a runtime environment and is not limited to code executed in the Microsoft .NET Framework.

Managed code environment 206 includes a runtime environment for compiling and executing intermediate code. In one embodiment, managed code environment 206 includes computer instructions executed by a Common Language Infrastructure (CLI)-compliant virtual machine, such as Microsoft's .NET Framework Common Language Runtime (CLR) component.

The Microsoft .NET Framework is a development and execution environment that allows different programming languages and libraries to work together to create applications. The .NET Framework includes a Common Language Runtime (CLR) component and Framework Class Libraries (FCL). CLR serves as an execution environment for .NET applications. The FCL provide a collection of classes or types that may be used to build .NET applications. The .NET Framework supports various programming languages such as Visual C#, Visual Basic .NET, and Visual J#.NET. The source code is compiled into intermediate code (called Microsoft Intermediate Language (MSIL)). The intermediate code is compiled by the CLR at runtime.

In managed code environment 206, the intermediate language is compiled at runtime into native machine code. Managed code may be verified before actually executed to ensure the execution does not cause a system failure. Managed code environment 206 may verify the reliability of managed code by inserting traps, performing type safety, performing array bounds and index checking, and the like.

Managed code environment 206 includes secure application area 208 supporting an application 221. A secure application area is used to separate applications from one another so that the faults of one application do not affect the operations of another application. A single secure application area is shown in FIG. 2 for clarity, but it will be understood that managed code environment 206 may include multiple secure application areas.

An embodiment of secure application area 208 includes an application domain (commonly referred to as an "appdomain"). In the .NET Framework, an application domain may be used to provide isolation between applications. Several application domains may be run in a single process with the same level of isolation that would exist in separate processes. Also, an individual application in an appdomain may be stopped without stopping the entire process.

Native code environment 204 includes unmanaged machine code, also referred to as native code. Native code is executed without the same controls as managed code in managed code environment 206. While typical OS management activities, such as memory management, occur with native code, typically, native code is loaded into memory and executed without the same control as in a managed code environment.

Figure 3:
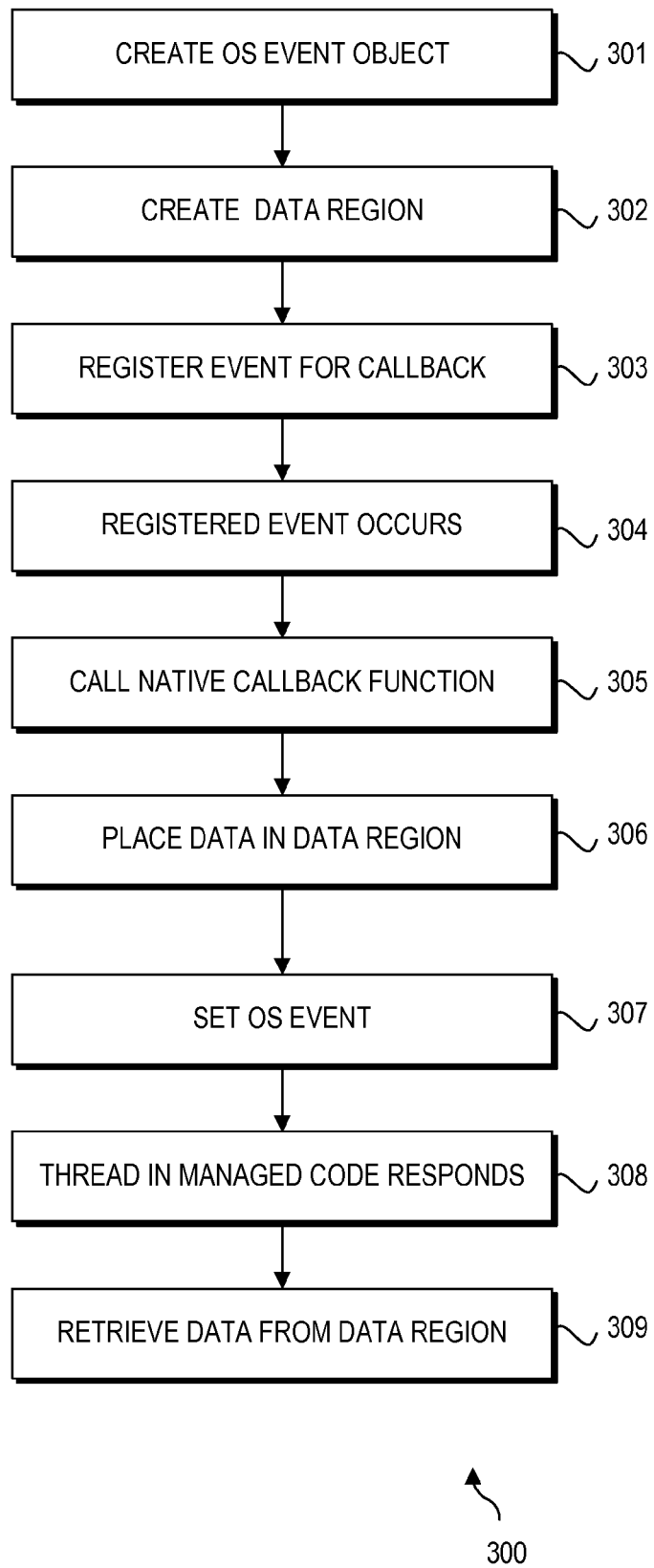
FIG. 3 is a flowchart showing the logic and operations of delivering callbacks into a secure application area in accordance with an embodiment of the invention.

Turning to FIG. 3, a flowchart 300 shows an embodiment of delivering callbacks into a secure application area. Discussion of flowchart 300 will make reference to FIG. 2. Embodiments of the invention are described for use with Event Tracing for Windows (ETW), however, it will be understood that embodiments herein are not limited to use with ETW. ETW enables application programmers to instrument an application for event tracing for debugging and performance analysis. ETW allows users to start and stop event tracing sessions, log user or kernel events, and consume events from a file.

Starting in block 301, an OS event object is created. In FIG. 2, OS event object 212 is shared between secure application area 208 and native code environment 204. In managed code environment 206, thread pool 218 is used to wait on OS event object 212. In an alternative embodiment, a static thread may be assigned to wait on OS event object 212.

In one embodiment, OS event object 212 is created using a CreateEvent Application Programming Interface (API) from Win32 APIs. The event is able to be returned across the secure application area boundary since the created event was created on a thread originating from secure application area 208. CreateEvent API returns a handle to the new event object. In one embodiment, the CreateEvent API is called by application 221.

In one embodiment, OS event object 212 is a manual-reset event object. When a manual-reset event object is signaled, the event object keeps signaling until manually told to reset. In another embodiment, OS event object 212 is an auto-reset event object, that is, the auto-reset event object automatically resets to a non-signal state when a waiting thread responds to the signal.

Alternative embodiments of the invention may use other techniques to signal the managed code area for indirectly delivering a callback. For example, secure application area 208 may be signaled by writing data to a file monitored by secure application area 208. In another example, a network packet may be sent for delivery to application 221.

Proceeding to block 302, a data region is created. In one embodiment, data region 210 may be implemented as a memory region shared between managed code and native code. For example, the managed code environment may allocate a piece of native memory area that may be used by managed code. In one embodiment, this may be done through a memory allocation technique. The managed code and the native code agree on the data format and other relevant information of this shared memory region. For example, in the .NET Framework, the method "Marshal.AllocHGlobal (IntPtr)" may be used to allocate memory from a process's unmanaged memory. In another embodiment, a portion of managed code environment memory may be allocated for data region 210.

In an alternative embodiment, data region 210 is not created through memory allocation as described in connection with block 302 above, but instead, data region 210 is part of native code memory resources for caching data associated with a callback. In this way, the location, formatting, and the like, of the callback data is managed by native code environment 204. Managed code environment 206 may use a GetData API to retrieve the callback data from the native code environment memory resources (described below).

Proceeding to block 303, the OS event object 212 is registered for callback. In one embodiment, a RegisterEvent API is called by managed code environment 206 to register the OS event object 212 with the native code environment. In one embodiment, the RegisterEvent API is called by application 221. In turn, a native callback function in native code is registered with a calling component that needs to deliver a callback to managed code environment 206. In FIG. 2, native callback function 214 is registered with calling component 216.

In an ETW example, native callback function 214 may be registered with the ETW infrastructure (that is, the calling component). In this example, the native callback function is called whenever a trace in application 221 is to be changed from enabled to disabled or disabled to enabled. ETW wants to convey this change of state to application 221 in secure application area 208. However, since secure application area 208 does not allow anonymous threads from native code to perform a callback into secure application area 208, ETW may not perform the callback directly across the secure application area boundary. Instead, ETW may signal the enabled/disabled event using embodiments described herein.

It will be appreciated that blocks 301-303 may be considered a setup phase. After block 303, the logic of flowchart 300 waits for the registered event to occur. When the registered event occurs, as shown in block 304, then the logic proceeds to the delivery phase (described in blocks 304-309) where the callback data (if any) is placed in data region 210, OS event object 212 is set, and subsequently data in data region 210 is read by managed code environment 206.

After the registered event occurs in block 304, the native callback function is called, as shown in block 305. In the embodiment of FIG. 2, calling component 216 calls the native callback function 214 when the registered event has occurred. In an ETW implementation, ETW notifies users when ETW is enabled or disabled. In this case, whenever ETW changes between enabled and disabled (i.e., tracing on or off), this change causes a call to the native callback function from ETW.

Continuing to block 306, data associated with the callback is placed in the data region. In some embodiments, no data is associated with the callback, so data is not placed in the data region. For example, in the case of ETW enabled/disabled, no data is cached in the data region because query functions are available in ETW to get any relevant trace data.

In one embodiment, data region 210 may be implemented as a queue to store data associated with multiple callbacks. When secure application area 208 wants to access the data region, it can track which data is associated with which callback using a generation identification (discussed below in conjunction with FIG. 4).

In another embodiment, some of or the entire data placed in data region 210 may be encrypted. In this way, the data is secured so that only authorized components in secure application area 208 may read the data. In one implementation, secure application area 208 provides a public key to native callback function 214 for encrypting the data when placed in data region 210. When the data is retrieved from data region 210, secure application area 208 may use a private key to decrypt the data.

After block 306, the logic continues to block 307 to set OS event object 212. Setting OS event object 212 will cause a thread in thread pool 218 waiting on the event to respond, as shown in block 308. In FIG. 2, native callback function 214 sets OS event object 212 which causes a managed thread in thread pool 218 to respond to the signaling OS event object 212.

Continuing to block 309, the data placed in the data region is retrieved for consumption by callback consumers 222 of application 221. In one embodiment, the managed thread retrieves the data from data region 210 and makes the data available to callback consumers 222. In another embodiment, callback consumers 222 are aware of data region 210 and callback consumers 222 retrieve the data from data region 210 when notified by the managed thread that the registered event has occurred.

In one embodiment, the data may be retrieved from data region 210 using a GetData API. In short, GetData API pulls data from data region 210. With the GetData API, the allocation and format of memory for data region 210 is managed by native code environment 204. The GetData API returns the data (or a pointer to the data) to the caller, such as callback consumers 222, in secure application area 208.

Figure 4:
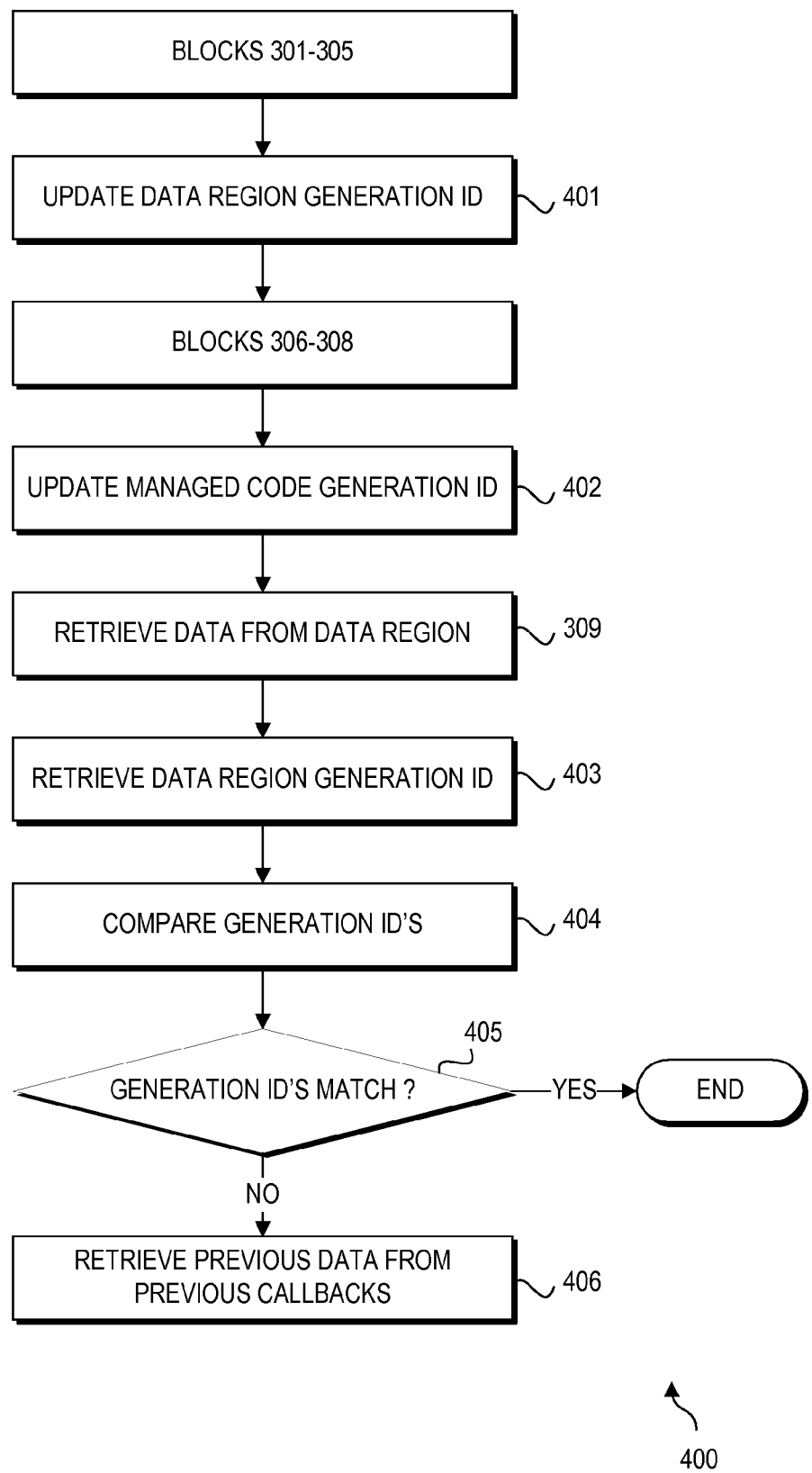
FIG. 4 is a flowchart showing the logic and operations of delivering callbacks into a secure application area in accordance with an embodiment of the invention.

Turning to FIG. 4, a flowchart 400 shows an embodiment of delivering callbacks into a secure application area. Discussion of flowchart 400 will make reference to FIG. 2. It will be appreciated that some blocks of flowchart 400 are similar to blocks of flowchart 300.

In the embodiment of flowchart 400, logic is provided to track the number of times native callback function 214 in native code environment 204 has actually been called. Since OS event object 212 is used to indirectly deliver the callback into managed code environment 206, there may be a loss of information such as how many times native callback function 214 was called. As described below, logic of secure application area 208 may use the number of times native callback function 214 was called to determine how many data records in data region 210 need processing.

In FIG. 4, the logic proceeds through blocks 301-305 as described above in connection with FIG. 3. After the native callback function is called in block 305, the logic proceeds to block 401 to update a data region generation identification (ID). As shown in the embodiment of FIG. 2, data region generation ID 211 may be kept as part of data region 210. In one embodiment, data region generation ID 211 may be a counter that is incremented each time native callback function 214 is called.

After block 401, the flowchart 400 continues through blocks 306-308 as described in connection with FIG. 3. After block 308, the logic proceeds to block 402 to update a managed code generation identification that indicates how many times OS event object 210 has been set. In FIG. 2, managed code generation ID 220 is updated by the managed thread from thread pool 218. In one embodiment, managed code generation ID 220 may be a counter that is incremented when OS event object 212 is set.

Continuing to block 309, the data in the data region is retrieved. Proceeding to block 403, the data region generation ID is retrieved. In the embodiment of FIG. 2, data region generation ID 211 is retrieved from data region 210. In one embodiment, the data region generation ID 211 may be returned as part of the GetData API return.

Proceeding to block 404, the managed code generation ID and the data region generation ID are compared. In decision block 405, the logic determines if the IDs match. If the answer is yes, then the logic ends. In this case, all of the native callback function calls have been attended to by managed code environment 206. In other words, each call to the native callback function has resulted in a corresponding signal from OS event object 212.

If the answer to decision block 405 is no, then one or more native callback function calls have been missed by secure application area 208. For example, a call to native callback function 214 may have occurred while OS event object 212 was still signaling a previous call. In this case, the logic proceeds to block 406 to retrieve previous data from previous native callback function calls.

In an ETW example, if the sequence of events is enabled/disabled/enabled, then the managed code environment may miss the disabled event. The use of the Generation IDs allows managed code environment 206 to recognize a missed signal from the native callback function, and thus, the missed disabled event. Managed code environment 206 may then take action, such as re-reading configuration information, to make up for the missed disabled event.

In one embodiment, data region 210 is implemented as a queue so that data previously placed in data region 210 from previous callbacks may be retrieved. For example, suppose the comparison of generation IDs indicates that two callbacks were missed by managed code, then the managed code may walk down the queue to retrieve data from the previous two callbacks.

Embodiments of the invention provide methods for delivering callbacks into secure application areas of managed code from native code. For example, in order to improve the security of managed code running inside Microsoft SQL Server, the ability to directly call into application domains from anonymous threads is restricted. Embodiments described herein provide for the ability of callbacks to be delivered to the managed code environment without violating security policies of a secure application area, such as an application domain. The managed code environment controls a one-way communication with the native code environment. Calls may be made out of a secure application area to register events and to retrieve callback data, but callback data is not pushed into the managed code environment.

Various operations of embodiments of the present invention are described herein. In one embodiment, one or more of the operations described may constitute computer readable instructions stored on computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of embodiments of the invention, including what is described in the Abstract, is not intended to be exhaustive or to limit the embodiments to the precise forms disclosed. While specific embodiments and examples of the invention are described herein for illustrative purposes, various equivalent modifications are possible, as those skilled in the relevant art will recognize in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A computer-implemented method, comprising:
registering a native callback function with a calling component in a native code environment, wherein registering the native callback function is initiated from a secure application area of a managed code environment that compiles and executes an intermediate code, wherein the secure application area is used to separate one or more applications from one another so that a fault of one of the one or more applications does not affect an operation of another of the one or more applications;
generating a manual-reset operating system event object that is shared between the native code environment and the secure application area of the managed code environment, wherein the manual-reset operating system event object signals the managed code environment that an event registered for monitoring has occurred; and
delivering a callback from the native callback function into the secure application area of the managed code environment utilizing the event object, wherein delivering the callback includes requesting, by the managed code environment, callback data associated with the callback from the native code environment, wherein the callback data is cached in a native code environment memory region;
wherein delivering the callback includes signaling the secure application area that the registered event has occurred, and a managed thread in the managed code environment retrieves the data from the data region in response the signaling.

2. The method of claim 1, further comprising creating a data region in memory, wherein callback data associated with the callback to be placed in the data region.

3. The method of claim 1, wherein the managed thread in the managed code environment notifies one or more callback consumers in the managed code environment that the registered event has occurred.

4. The method of claim 1, wherein delivering the callback includes determining whether any callbacks from the native callback function have not been processed by the managed code environment.

5. The method of claim 4, further comprising retrieving data associated with previous callbacks from the data region that have not been previously retrieved.

6. One or more computer storage media including computer executable instructions embodied thereon that, when executed, perform operations comprising:
- receiving a callback at a native callback function in a native code environment of an operating system in response to a registered event occurring, wherein the callback is initiated from a secure application area of a managed code environment that compiles and executes an intermediate code in response to the setting of the OS event object, wherein the secure application area is used to separate one or more applications from one another so that a fault of one of the one or more applications does not affect an operation of another of the one or more applications;
- placing data associated with the callback in a data region by the native callback function;
- setting a manual-reset operating system (OS) event object by the native callback function, wherein the manual-reset operating system event object signals the managed code environment that an event registered for monitoring has occurred and wherein the manual-reset operating system event object continuously signals the managed code environment until manually instructed to reset; and
- retrieving the data from the data region into a secure application area in a managed code environment;
- wherein retrieving the data from the data region includes:
  - issuing a GetData call by the managed code environment, and
  - returning, by the native code environment, in response to the GetData call, the data associated with the callback from the data region.

7. The one or more computer storage media of claim 6, wherein the computer executable instructions, when executed, further perform operations comprising:
- initiating the creation of the OS event object in the native code environment by the managed code environment.

8. The one or more computer storage media of claim 6, wherein the computer executable instructions, when executed, further perform operations comprising:
- allocating, by the managed code environment, a portion of native code environment memory for use as the data region.

9. The one or more computer storage media of claim 6, wherein the computer executable instructions, when executed, further perform operations comprising:
- registering the native callback function with a calling component, wherein the calling component notifies the native callback function when the registered event has occurred.

10. The one or more computer storage media of claim 6, wherein the computer executable instructions, when executed, further perform operations comprising:
- determining whether any callbacks from the native callback function have not been processed by the managed code environment.

11. The one or more computer storage media of claim 10, wherein the computer executable instructions, when executed, further perform operations comprising:
- retrieving data associated with previous callbacks from the data region that have not been previously retrieved.

12. The one or more computer executable media of claim 6, wherein the data placed in the data region is encrypted.

13. Computer-readable storage media having embodied thereon computer-useable instructions that when executed, implement a system for delivering callbacks into a managed code environment without directly calling into a secure application area, the system comprising:
- a managed code environment component that includes an application domain, wherein the managed code environment component compiles and executes an intermediate code, the application domain registers a native callback function with a calling component in a native code environment component;
- the native code environment component including the native callback function, wherein the native callback function is configured to place callback data in a data region in response to the callback associated with an event occurrence and wherein the native callback function initiates the signaling of the application domain of the event occurrence; and
- a generation component configured to generate at least one manual-reset operating system event object that is shared between the native code environment and the secure application area of the managed code environment, wherein the manual-reset operating system event object signals the managed code environment that an event registered for monitoring has occurred;
- wherein the managed code environment component includes a managed thread, wherein the managed thread to notify a callback consumer in the application domain of the event occurrence in response to the generated manual-reset operating system event object, and the managed thread retrieves the callback data from the data region in response to the signaling.

14. The media of claim 13, wherein the native code environment component includes an operating system (OS) event object, the native callback function to set the OS event object in response to receiving the call.

* * * * *